US012755652B1

(12) United States Patent
Lord et al.

(10) Patent No.: US 12,755,652 B1

(45) Date of Patent: Oct. 6, 2026

(54) PHALANGEAL DISLOCATION REDUCTION MODEL

(71) Applicants: Garrett Lord, Monroe, CT (US); Spencer Lord, Albany, NY (US); Sean Geary, Glenmont, NY (US)

(72) Inventors: Garrett Lord, Monroe, CT (US); Spencer Lord, Albany, NY (US); Sean Geary, Glenmont, NY (US)

(*) Notice: Subject to any disclaimer, the term of this patent is extended or adjusted under 35 U.S.C. 154(b) by 464 days.

(21) Appl. No.: 18/448,099

(22) Filed: Aug. 10, 2023

Related U.S. Application Data

(60) Provisional application No. 63/396,914, filed on Aug. 10, 2022.

(51) Int. Cl.
*G09B 23/32* (2006.01)

(52) U.S. Cl.
CPC .................................... *G09B 23/32* (2013.01)

(58) Field of Classification Search
CPC ........ G09B 23/28; G09B 23/30; G09B 23/32; A61F 2/586
USPC .......................................................... 434/274
See application file for complete search history.

(56) References Cited

U.S. PATENT DOCUMENTS 2,435,614 A * 2/1948 Tureman, Jr. ........... A61F 2/583 623/64
2,549,074 A * 4/1951 Fishbein ................. A61F 2/583 623/64
2,641,769 A * 6/1953 Robinson ................ A61F 2/583 623/64
3,188,753 A * 6/1965 Lovercheck ............. A63H 3/18 623/64
4,332,570 A * 6/1982 Getty ..................... G09B 23/32 434/274
4,466,800 A * 8/1984 Breiden ................. G09B 23/32 623/64
4,685,929 A * 8/1987 Monestier ............... A61F 2/583 623/64

(Continued)

FOREIGN PATENT DOCUMENTS

CN 116403464 A * 7/2023 ............. G09B 23/32
KR 20210111133 A * 9/2021 ............. G09B 23/32

OTHER PUBLICATIONS

Golan, E., et al., The epidemiology of finger dislocations presenting for emergency care with the United States, Hand, Feb. 19, 2016, vol. 11, No. 1, pp. 192-196.

(Continued)

*Primary Examiner* — Kurt Fernstrom

(74) *Attorney, Agent, or Firm* — Hodgson Russ LLP

(57) ABSTRACT

Our device presents a novel 3-dimensional model that can be configured to present a complex dorsal and/or volar dislocation requiring anatomically correct maneuvers to achieve successful reduction. The size of our device approximates the scale and geometry of an adult hand. The second and third fingers may be configured to function as a dislocated proximal interphangeal joint ("PIPJ") in closed complex dorsal dislocation, and the fourth and fifth fingers may be configured to function as a dislocated PIPJ in closed volar (Continued)

dislocation with reduction achieved by the exaggeration-by-deformity technique. The second, third, fourth, and fifth fingers may be detachable from the palm by a hinge.

33 Claims, 12 Drawing Sheets

(56) References Cited

U.S. PATENT DOCUMENTS

| | | | | | |
|---|---|---|---|---|---|
| 4,838,795 | A * | 6/1989 | Draenert | A61F 2/4684 | 434/274 |
| 5,200,679 | A * | 4/1993 | Graham | B25J 15/0009 | 901/33 |
| 6,488,506 | B2 * | 12/2002 | Grace | G09B 23/30 | 623/64 |
| 7,655,051 | B2 * | 2/2010 | Stark | A61F 2/70 | 623/64 |
| 7,921,741 | B2 * | 4/2011 | Moller | G09B 23/32 | 73/865.6 |
| 8,177,856 | B2 * | 5/2012 | Jaworski | A61F 2/586 | 623/64 |
| 8,936,289 | B1 * | 1/2015 | Kozlowski | B25J 19/0091 | 901/45 |
| 10,045,865 | B2 * | 8/2018 | Veatch | A61F 2/68 | |
| 10,223,932 | B1 * | 3/2019 | Simmons | G09B 19/0076 | |
| 11,351,042 | B2 * | 6/2022 | Jury | B25J 15/0009 | |
| 2011/0076661 | A1 * | 3/2011 | Mitchell | G09B 23/32 | 434/274 |
| 2011/0144770 | A1 * | 6/2011 | Moyer | A61F 2/586 | 623/64 |
| 2025/0246097 | A1 * | 7/2025 | Patterson | G09B 23/30 | |

OTHER PUBLICATIONS

Prucz, R., et al., Finger joint injuries, Clinics in Sports Medicine, Jan. 2015, vol. 34, No. 1, pp. 99-116.

Jerome, T.J.J., Volar dislocation of the proximal interphalangeal joint, Orthoplastic Surgery, vol. 5, pp. 6-8.

Luna, Athletic Training Students Learn Technique using Luna's Joint Reduction Training, 2021, 3 pages. https://lunainc.com/blog/athletic-training-students-learn-technique-usinglunas-joint-reduction-trainer.

Polansky, R., et al., Reduction of Finger Dislocation, Medscape, 2021, 7 pages. https://emedicine.medscape.com/article/109206-overview.

Roberts, J.R., et al., Clinical Procedures in Emergency Medicine, W. B.Saunders Co., Philadelphia, PA, 1998, 1787 pages.

Adlughmin, The Flexy-Hand—The Most Innovative, Useful, Realistic Looking 3D Printed Prosthetic Hand Yet, Mar. 10, 2014, 11 pages. https://3dprint.com/1500/the-flexy-hand-3d-printed-prosthetic.

Bindra, R.R., et al., Management of Proximal Interphalangeal Joint Dislocations in Athletes, Hand Clinics, Jul. 28, 2009, vol. 25, No. 3, pp. 423-435.

Tuffaha, S.H., et al., Treatment of Proximal Interphalangeal Joint Contracture, Hand Clinics, May 2018, vol. 34, No. 2, pp. 229-235.

Wright, C.J., et al., Closed-Reduction Techniques for Glenohumeral-, Patellofemoral-, and Interphalangeal-Joint Dislocations, Journal of Athletic Training, Jul. 20, 2020, vol. 55, No. 8, pp. 757-767.

Zilverschoon, M., et al., Support for using a three-dimensional anatomy application over anatomical atlases in a randomized comparison, Anatomical Sciences Education, Jun. 17, 2021, vol. 15, pp. 178-186.

Lim, K.H.A., et al., Use of 3D printed models in medical education: A randomized control trial comparing 3D prints versus cadaveric materials for learning external cardiac anatomy, Anatomical Sciences Education, Oct. 15, 2015, vol. 9, pp. 213-221.

Ye, Z., et al., The role of 3D printed models in the teaching of human anatomy: a systematic review and meta-analysis, BMC Medical Education, Sep. 29, 2020, vol. 20, No. 335, pp. 1-9.

Cai, B., et al., The Effects of a Functional Three-dimensional (3D) Printed Knee Joint Simulator in Improving Anatomical Spatial Knowledge, Anatomical Sciences Education, Dec. 7, 2018, vol. 12, No. 6, pp. 610-618.

Fennelly, J.T., et al., A systematic review of pre-hospital shoulder reduction techniques for anterior shoulder dislocation and the effect on patient return to function, Chinese Journal of Traumatology, Aug. 12, 2020, vol. 23, No. 5, pp. 295-301.

Senuren, C.O., et al., Developing Cricothyroidotomy Skills Using a Biomaterial-Covered Model, Wilderness & Environmental Medicine, Sep. 1, 2020, vol. 31, No. 3, pp. 291-297.

* cited by examiner

PHALANGEAL DISLOCATION REDUCTION MODEL

CROSS-REFERENCE TO RELATED APPLICATION

This application claims the benefit of priority to U.S. provisional patent application Ser. No. 63/396,914, filed on Aug. 10, 2022.

FIELD OF THE INVENTION

The invention generally relates to medical teaching aids.

BACKGROUND OF THE INVENTION

Proximal closed joint dislocation of a human finger are a relatively common joint complication that presents to the emergency department of healthcare facilities, such as a hospital emergency room. In the United States, finger dislocations are frequent causes of hand injuries with an incidence of 11.11 per 100,000 person-years, and dislocation of the proximal interphalangeal joint ("PIPJ") is the most common (Golan et al. 2016). Closed PIPJ dislocations come in two types: dorsal and volar dislocations. Dorsal dislocations are typically caused by longitudinal compression and hyperextension with subsequent injury to the volar plate, collateral ligament, and dorsal joint capsule (Prucz et al 2015). Dorsal dislocations are much more common than Volar dislocations. Volar dislocations are caused by compression and rotation with PIPJ flexion, and sometimes may be difficult to reduce without surgical intervention (Jermone 2021). However, both complex and simple dislocations may be amenable to closed reduction.

Despite being a frequent occurrence, there is a paucity of affordable teaching models for medical providers to practice closed reduction. There are very few teaching models for practice purposes. There is a commercially available model produced by LUNA Innovations that can mimic a closed dorsal dislocation, but the model is expensive, thereby limiting availability (LUNA 2021). Others have published teaching videos that demonstrate a step-by-step process of reducing the dorsal dislocation or the volar dislocation. However, these videos do not provide hands-on training.

SUMMARY OF THE INVENTION

We invented a low cost, high accuracy, and high quality model that allows for teaching and practicing the exaggeration-by-deformity technique described by Roberts and Hedges et al (1998). Our model may be configured to permit teaching and practicing of both closed dorsal and volar PIPJ reduction techniques.

Our invention may be implemented using low-cost components, which may be acquired at a hardware store, in combination with 3D printable components. These components may be replaceable and can be implemented without machining.

Our model may be implemented to articulate in a manner that allows the PIPJ to be rotated 180 degrees along its axis so that a healthcare provider may practice both dorsal and volar reductions, while also preventing inappropriate translation of the model components.

Our phalangeal dislocation reduction model provides the ability for healthcare providers to practice one or both of: (1) dorsal reduction and volar reduction. Our model is shaped to resemble in some aspects the features of a hand, with each phalange of a human finger represented by a proximal, middle, and distal portion. Our model may be sized and shaped to mimic the size and shape of a real hand to provide realistic anatomy during the technique. A compression pin extends through two axles connecting the proximal portion to the middle portion. Guide rails in the distal end of the proximal portions mate with opposing rails in the proximal end of the middle portions to prevent an inappropriate translation of the model components. The combination of the compression pin and mating surfaces, along with an articulating convexity at the knuckle in the middle portion and a distal joint concavity along the distal dorsal surface of the proximal portions, allows action mimicking the natural motion when performing traction with a dorsal or volar dislocation of the finger.

BRIEF DESCRIPTION OF THE DRAWINGS

For a more complete understanding of our model, reference should be made to the detailed description (below) taken in conjunction with the accompanying drawings. Briefly, the drawings are.

DETAILED DESCRIPTION OF THE INVENTION

Figure 1A:
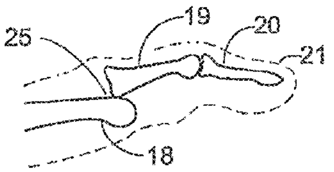
FIG. 1A is a section diagram of a dorsal PIPJ dislocation.
Figure 1B:
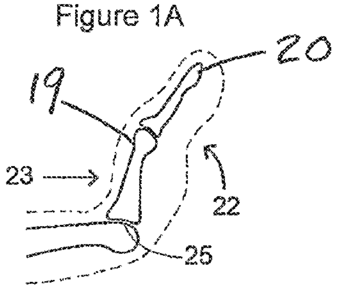
FIG. 1B is a section diagram of the exaggeration by deformity technique.
Figure 1C:
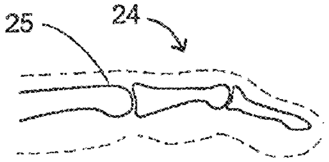
FIG. 1C is a section diagram of the resting position of the finger.

FIGS. 1A, 1B, and 1C show a stepwise diagram of dorsal dislocation and reduction using the exaggeration-by-deformity technique. FIG. 1A shows a diagram of a dorsal PIPJ dislocation, which identifies the proximal phalange 18, middle phalange 19, distal 20 phalange and finger outline 21. FIG. 1B shows how to perform the exaggeration-by-deformity technique by rotating 22 the middle and distal phalange 19, 20 in order to exaggerate the dislocation, then pushing 23 perpendicular to middle phalange 19. FIG. 1C, shows the action to rotate 24 into reduced position. Normally the surface articulation of the proximal and middle phalanges 18, 19 is facilitated by a saddle-shaped median 25 (FIGS. 1A, 1B, and 1C), which may be used to provide stability in flexion-extension positioning and also may be used to prevent lateral and rotational movements.

Figure 1D:
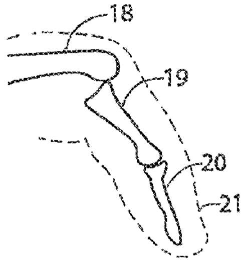
FIG. 1D is a section diagram of a volar PIPJ dislocation.
Figure 1E:
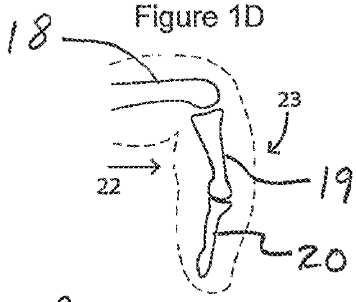
FIG. 1E is a section diagram of the exaggeration by deformity technique.
Figure 1F:
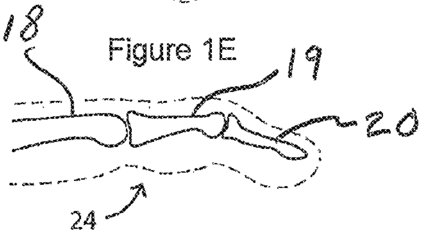
FIG. 1F is a section diagram of the resting position of the finger.

FIGS. 1D, 1E, and 1F show a stepwise diagram of volar dislocation and reduction using the exaggeration-by-deformity technique. FIG. 1D shows a diagram of a volar PIPJ dislocation, identifying the proximal phalange 18, middle phalange 19, distal phalange 20, and finger outline 21. FIG. 1E shows how to perform the exaggeration-by-deformity technique by exaggerating 22 the dislocation, by pushing 23 perpendicular to middle phalange. FIG. 1F, shows the action to rotate 24 into a reduced position.

Figure 2A:
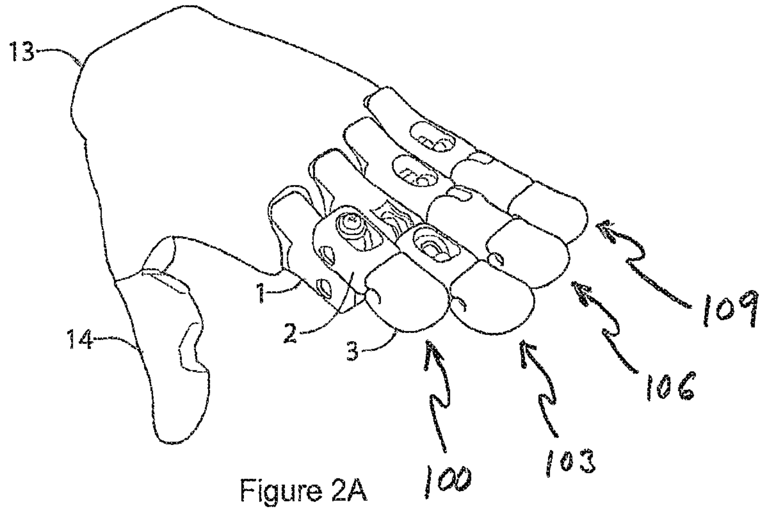
FIG. 2A perspective view of the PIPJ complex dorsal dislocation with exaggeration-by-deformity technique of the second finger.
Figure 2B:
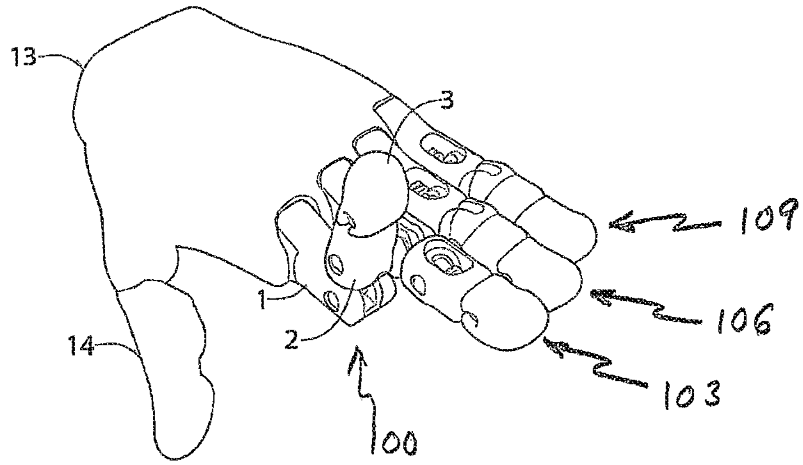
FIG. 2B is a perspective view of hyperextension of the PIPJ.
Figure 2C:
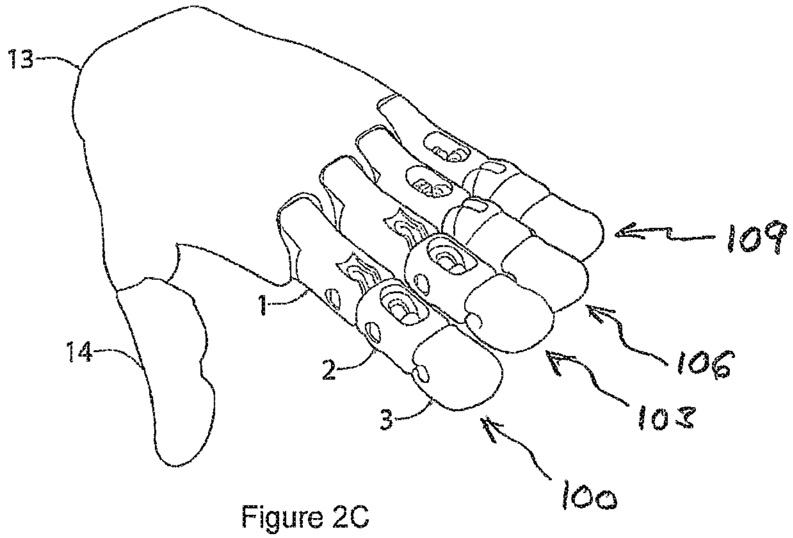
FIG. 2C is a perspective view of reduction back to the neutral position.

FIG. 2A shows our model with a PIPJ complex dorsal dislocation on the second finger 100, FIGS. 2B and 2C show positions executed by the exaggeration-by-deformity technique of the second finger 100 which is comprised of a proximal portion 1, middle portion 2, and distal portion 3. The palm 13 and thumb 14 may remain static during the technique. FIG. 2B shows a next step by rotating the middle and distal portions 2, 3 while the palm 13, thumb 14 and proximal phalanges 1 remain static. Next, the middle portion 2 and distal portion 3 are rotated relative to the proximal portion 1 in order to achieve the reduce position shown in FIG. 2C. FIG. 2C shows the middle portion 2 and the distal portion 3 reduced back to the neutral position.

Figure 3A:
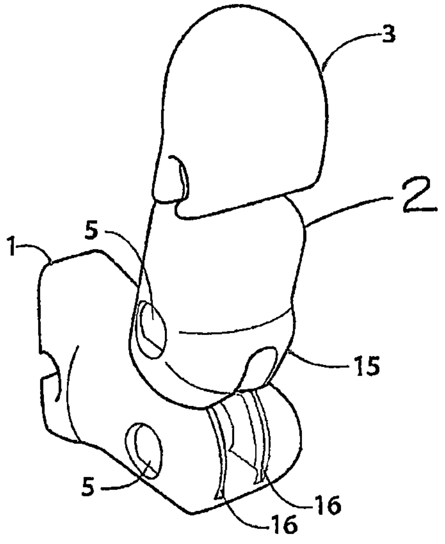
FIG. 3A is an enlarged perspective view of the second finger of FIG. 2B in the hyperextension position.

FIG. 3A is an enlarged perspective diagram example of hyperextension of the second finger 100 showing the proximal portion 1 in a neutral position with the middle portion 2 and distal portion 3 rotated into the hyperextended position and the articulating convexity 15 visible along the proximal side of the middle portion 2. Guide rails 16 on the distal side of the proximal portion 1 mate with similar rails on the proximal side of the middle portion 2 in order to prevent unintended rotation out of alignment with the proximal portion 1. Two axles 5 allow rotation of the middle portion 2 independent from the proximal portion 1.

Figure 3B:
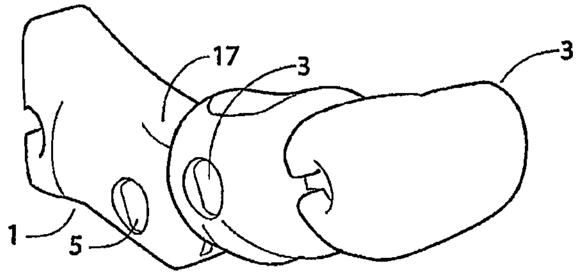
FIG. 3B is an enlarged perspective view of the second finger of FIG. 2B in hyperextension moving towards the neutral position.
Figure 3C:
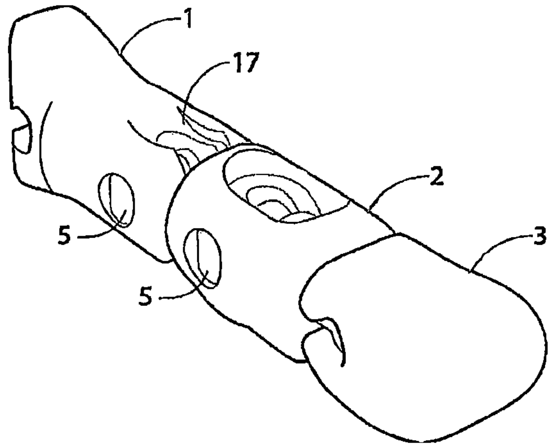
FIG. 3C is an enlarged perspective view of the second finger of FIG. 2C in the neutral position.

FIG. 3B shows the proximal portion 2 and distal portion 3 being rotated toward the neutral position, with the proximal portion 1 staying in position. As rotation progresses, the middle portion 2 clears the distal joint concavity 17 along the dorsal surface of the proximal portion 1. FIG. 3C shows the middle portion 2 and distal portion 3 returned to the neutral position in relation to the proximal portion 1.

Figure 4A:
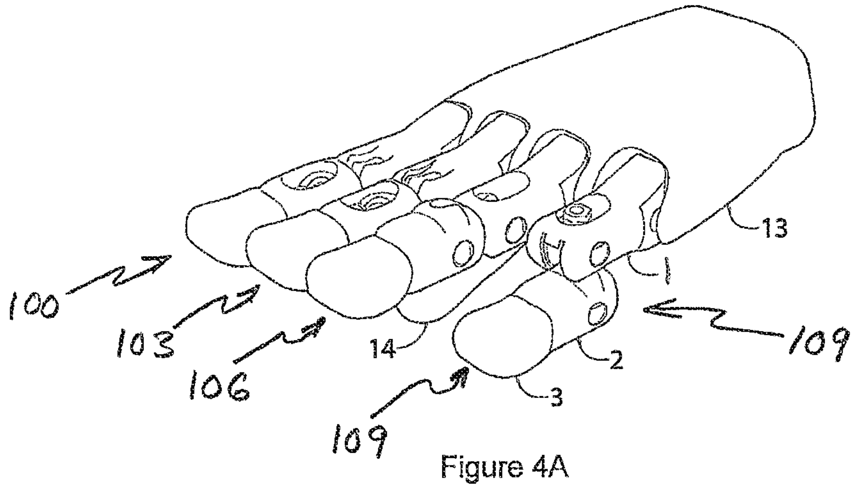
FIG. 4A is a perspective view of a PIPJ volar dislocation of the fifth finger
Figure 4B:
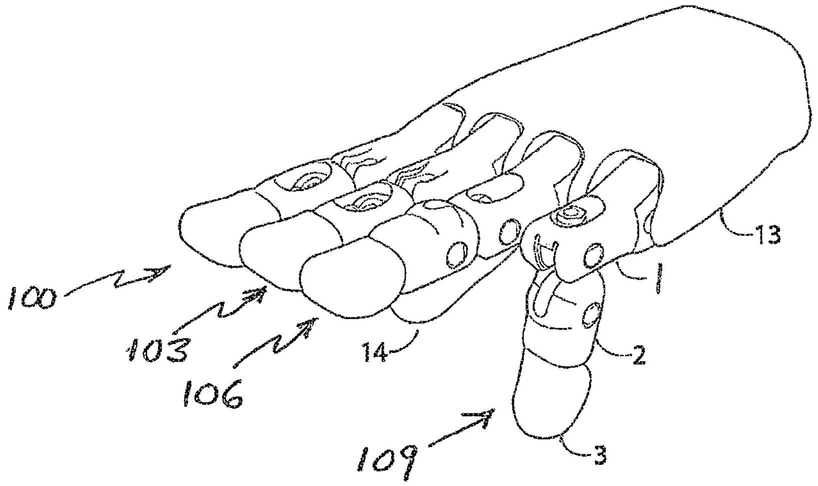
FIG. 4B is a perspective view of the flexion reduction position of the PIPJ
Figure 4C:
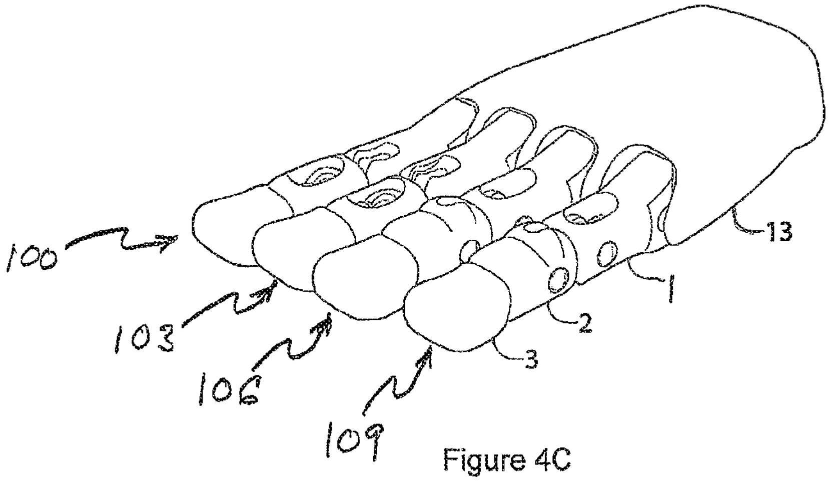
FIG. 4C: perspective view of reduction back to the neutral position.

FIG. 4A shows a PIPJ complex volar dislocation of the fifth finger 109 comprised of the proximal portion 1, the middle portion 2, and the distal portion 3. The palm 13 and thumb 14 may remain static during the exaggeration-by-deformity technique. FIG. 4B shows the next step of flexion reduction position of the PIPJ where the palm 13, thumb 14 and proximal portion 1 may remain static, and the middle portion 2 and distal portion are rotated downward. Next, the middle portion 2 and distal portion 3 are rotated relative to the proximal portion 1 in order to achieve the reduced position of FIG. 4C. FIG. 4C shows the middle portion 2 and the distal portion 3 reduced back to the neutral position.

Figure 5:
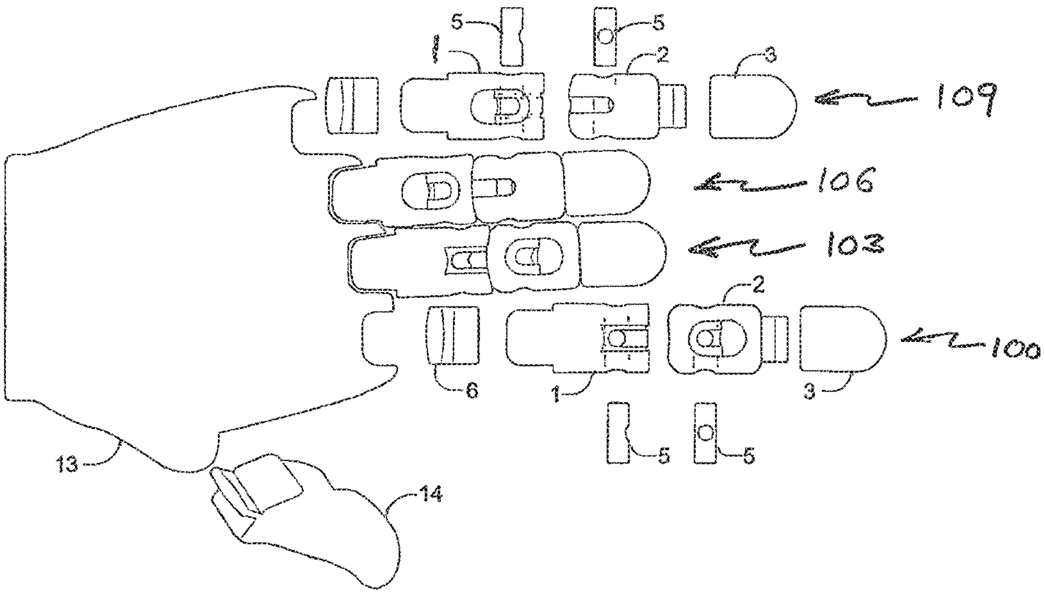
FIG. 5: is a top view of FIG. 2C with the disassembled second finger of FIG. 3A and fifth finger without machine screw, resilient washers, or flat washers.

FIG. 5 is atop view of our model, with the second and fifth fingers 100, 109 disassembled to show components. Those components include the proximal portions 1, middle portions 2, distal portions 3, axle 5, proximal-to-palm hinge 6, palm 13, and thumb 14.

Figure 6A:
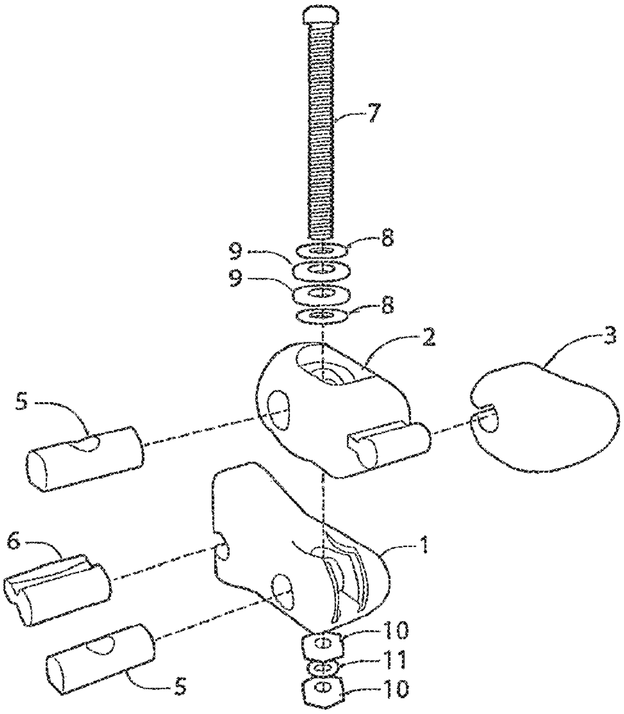
FIG. 6A is an exploded isometric view of the assembly of the dorsal dislocation joint to show the embodiments of the invention.
Figure 6B:
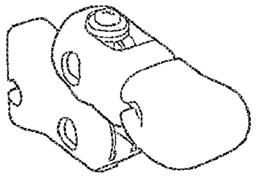
FIG. 6B is an isometric view of the dorsal dislocation joint in a compiled assembly in the dislocated position.

FIG. 6A is an isometric view of the exploded assembly of the dorsal dislocation joint. The components shown are proximal portion 1, middle portion 2, distal portion 3, axle 5, proximal-to-palm hinge 6, machine screw 7, flat washer 8, resilient washer 9, machine screw nut 10, and lock washer 11. FIG. 6B shows the compiled assembly of the PIPJ complex dorsal dislocation in the dislocated position.

Figure 7A:
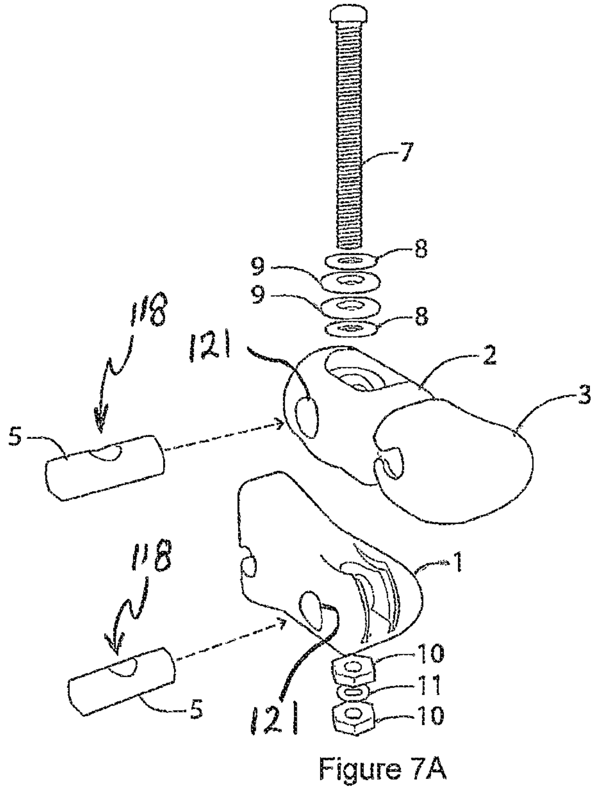
FIG. 7A is an exploded isometric view of the dorsal dislocated finger similar to FIG. 6A, with instruction to insert the two pins in the proximal and middle finger portions and align the hole in the pins with the central openings in the middle and proximal finger portions.
Figure 7B:
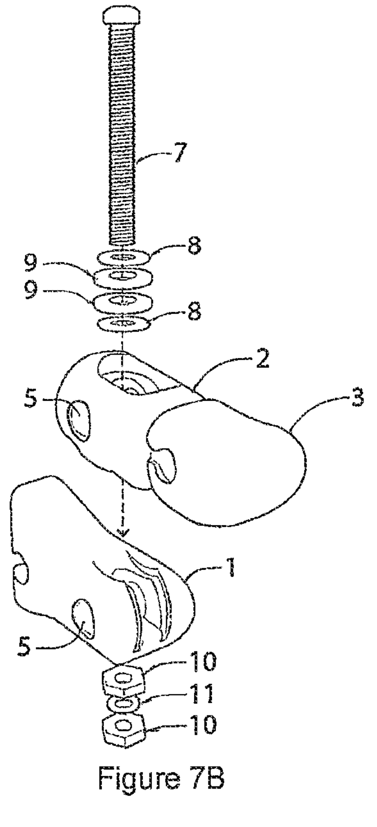
FIG. 7B is an exploded isometric view of the dorsal dislocated finger with instruction to load first a single machine washer, then two resilient washers, then a single machine washer onto the machine screw.
Figure 7C:
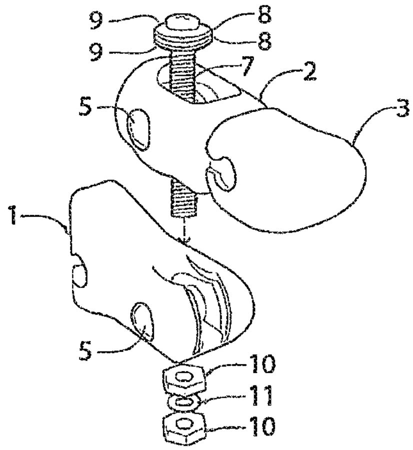
FIG. 7C is an exploded isometric view of the dorsal dislocated finger with instruction to load the screw dorsally through the pin in the middle finger portion.
Figure 7D:
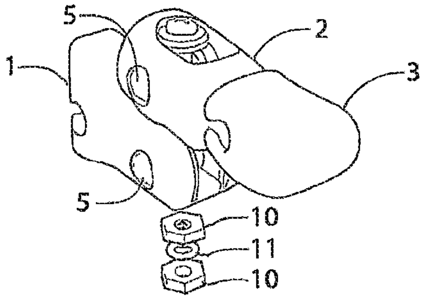
FIG. 7D is an exploded isometric view of the dorsal dislocated finger with instruction to pass the machine screw through pin in the proximal phalanges and attach first screw nut, then lock washer, and then another screw nut.
Figure 7E:
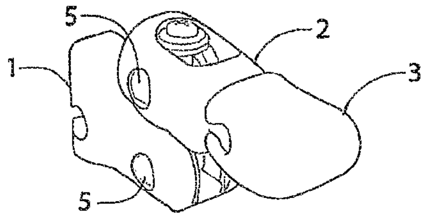
FIG. 7E is an isometric view showing a fully assembled finger in the dorsal dislocated position, similar to FIG. 6B.

FIGS. 7A, 7B, 7C, 7D, and 7E are isometric diagrams showing the stepwise assembly of the PIPJ complex dorsal dislocation finger. FIG. 7A shows the axles 5 being inserted into openings 121 in the proximal portion 1 and the middle portion 2, with the distal portion 3 attached to the middle portion 2. The openings 118 in the axles 5 must be aligned with openings in the proximal portions 4 and the middle portions 2 in order to allow the machine screw 7 to pass through both. FIG. 7B shows the axles 5 in place and the machine screw 7 being loaded with first the machine washer 8, then two resilient washers 9, then a second machine washer 8. FIG. 7C shows the machine screw being inserted dorsally through the middle portion 2 and the corresponding axle 5. FIG. 7D shows the exposed portion of the machine screw 7 as it passes through the axle 5 in the proximal portion 1 just prior to mating with a screw nut 10, followed by a lock washer 11, followed by a second screw nut 10. FIG. 7E shows the model finger assembled in the dorsal dislocated position. From this position a user of the model may follow the stepwise process described in conjunction with FIGS. 2A, 2B, and 2C to test for resistance. The two screw nuts 10 may be adjusted until a desired resistance is achieved.

Figure 8A:
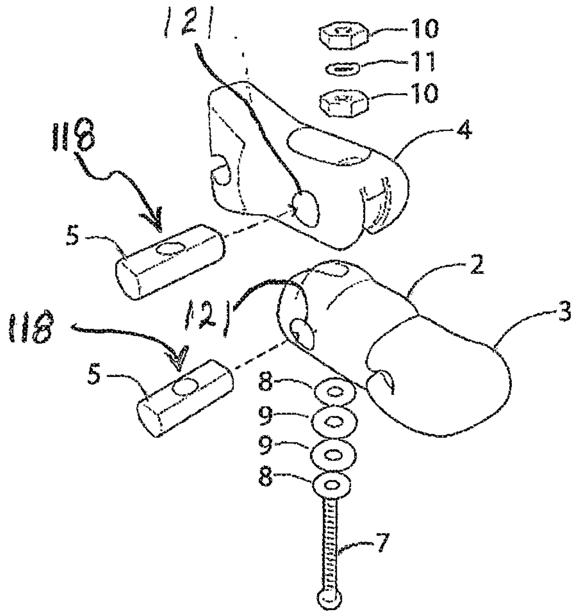
FIG. 8A is an exploded isometric view of the volar dislocated finger with instruction to insert the two pins in the proximal and middle finger portions and align the hole in the pins with the central openings in the middle and proximal finger portions.
Figure 8B:
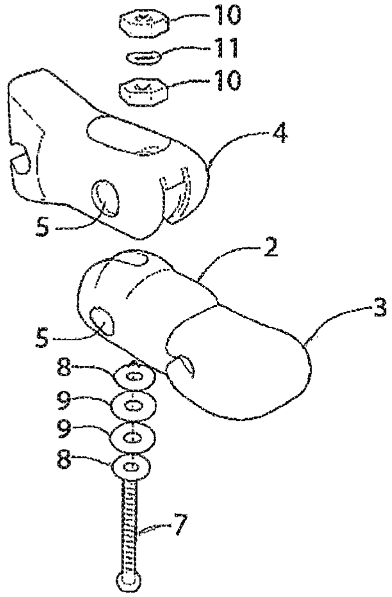
FIG. 8B is an exploded isometric view of the volar dislocated finger with instruction to load first a single machine washer, then two resilient washers, and last a single machine washer onto the machine screw.
Figure 8C:
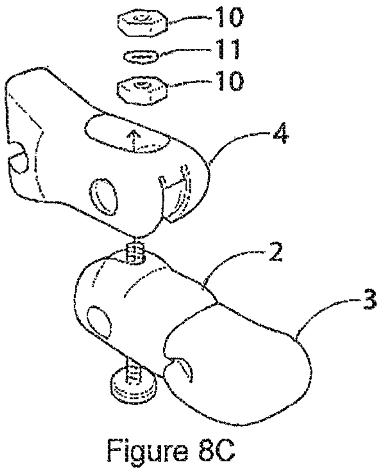
FIG. 8C is an exploded isometric view of the volar dislocated finger with instruction to load the screw dorsally through the pin in the middle finger portion.
Figure 8D:
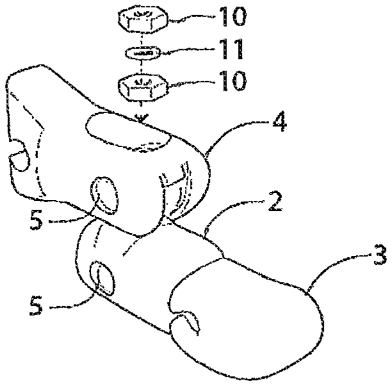
FIG. 8D is an exploded isometric view of the volar dislocated finger with instruction to pass the machine screw through pin in the proximal phalanges and attach first screw nut, then lock washer, and then another screw nut.
Figure 8E:
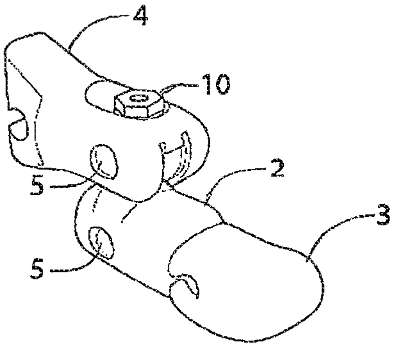
FIG. 8E is an isometric view showing a fully assembled finger in the volar dislocated position.

FIGS. 8A, 8B, 8C, 8D, and 8E are isometric diagrams showing stepwise an assembly of the PIPJ complex volar dislocation finger. FIG. 8A shows the axles 5 being inserted into openings 121 in the proximal portion 4 and the middle portion 2, with the distal portion 3 attached to the middle portion 2. The openings 118 in the axles 5 must be aligned with openings in the proximal portions 4 and the middle portions 2 in order for the machine screw 7 to pass through both. FIG. 8B shows the axles 5 in place and the machine screw 7 about to be inserted through the machine washer 8, then two resilient washers 9, then a second machine washer 8. FIG. 8C shows the machine screw about to pass into and through the proximal portion 4 and the axle 5. FIG. 8D shows a lock washer 11, followed by a second screw nut 10 being attached to the machine screw 7. FIG. 8E shows the assembled model finger in the volar dislocated position. From this position, a user of the model may follow the stepwise process described in conjunction with FIGS. 4A, 4B, and 4C to test for resistance. The two screw nuts 10 may be adjusted until a desired resistance is achieved.

Figure 9A:
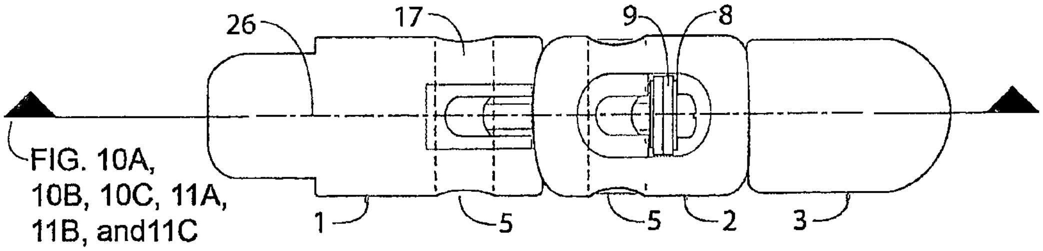
FIG. 9A: is a top view of the dorsal PIPJ in resting position of FIG. 3C.
Figure 9B:
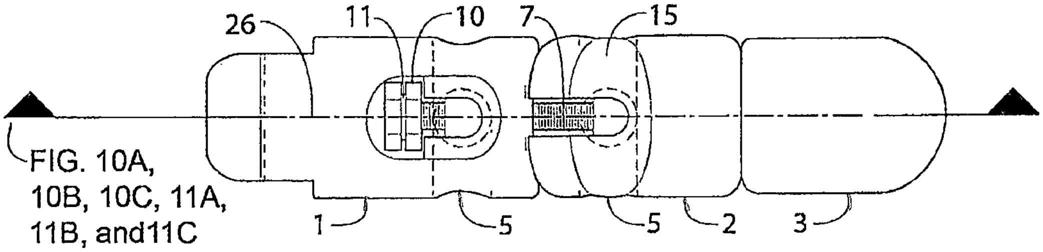
FIG. 9B: is a bottom view of the dorsal PIPJ in resting position of FIG. 3C.
Figure 9C:
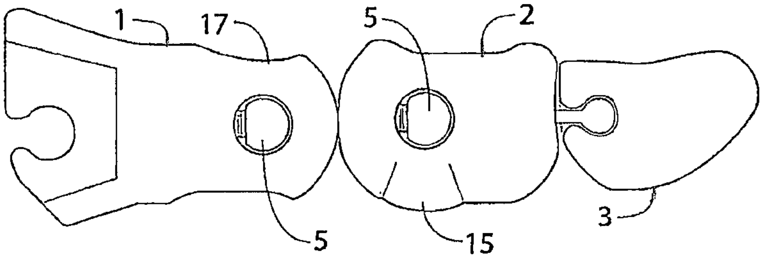
FIG. 9C is a side view of the dorsal PIPJ in resting position of FIG. 3C.
Figure 9D:
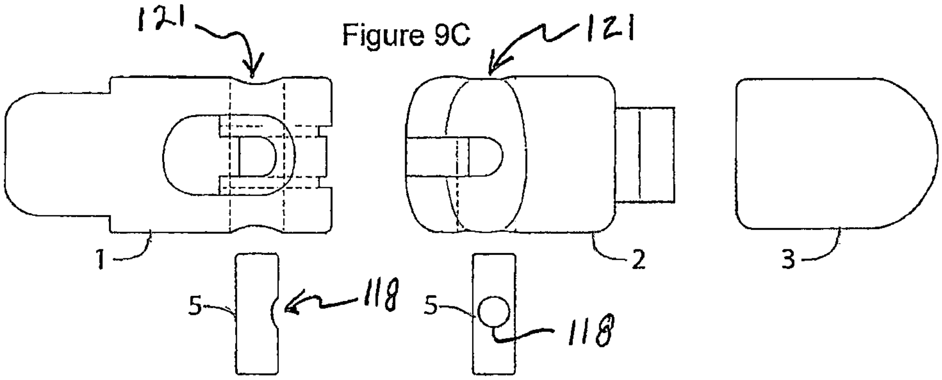
FIG. 9D is an exploded bottom view of FIG. 9B.
Figure 9E:
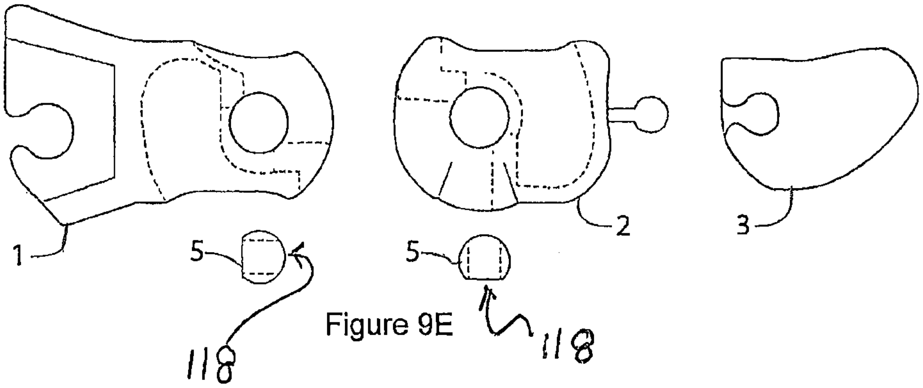
FIG. 9E is and exploded side view of FIG. 9C.

FIG. 9A is a top view (dorsal side) of an assembled dorsal dislocation finger of a PIPJ in the neutral position showing the proximal portion 1, middle portion 2, distal portion 3, axle 5, machine screw 7, machine washer 8, resilient washers 9, and distal joint concavity 17, along the dorsal surface of the proximal portion 1. FIG. 9B is a bottom view of the assembled dorsal dislocation finger of FIG. 9A in the neutral position showing the proximal portion 1, middle portion 2, distal portion 3, axle 5, machine screw 7, screw nut 10, and lock washer 11, and articulating convexity 15 along the proximal volar side of the middle portion 2. FIG. 9C is a side view showing the proximal portion 1, middle portion 2, distal portion 3, axle 5, articulating convexity 15, along the proximal volar side of the middle portion 2, and distal joint concavity 17, along the distal dorsal surface of the proximal portion 1. FIG. 9D is an enlarged bottom view (vertical side) of the second finger 100 showing the proximal portion 1, middle portion 2, distal portion 3, axle 5. One of the axles 5 has been rotated along its major axis for more detail. FIG. 9E is an exploded side view showing the proximal portion 1, middle portion 2, distal portion 3, axle 5. One of the axles 5 has been rotated along its major axis for more detail.

Figure 10A:
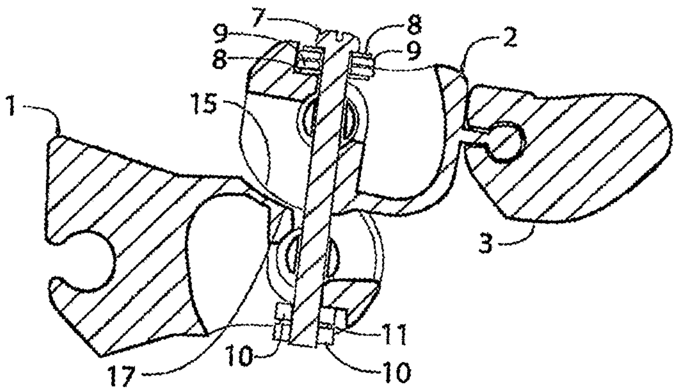
FIG. 10A is a section of the dorsal PIPJ dislocation of FIG. 6B demonstrating the reduction of a dorsal dislocation of FIG. 1A.
Figure 10B:
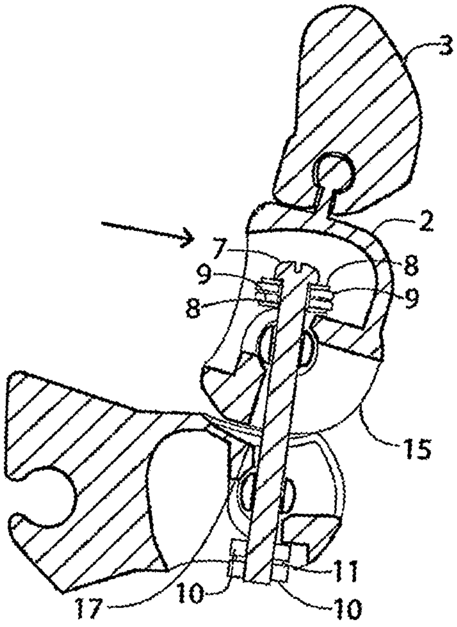
FIG. 10B is a section of the dorsal PIJ dislocation of FIG. 3A demonstrating the exaggeration-by-deformity technique of FIG. 1B.
Figure 10C:
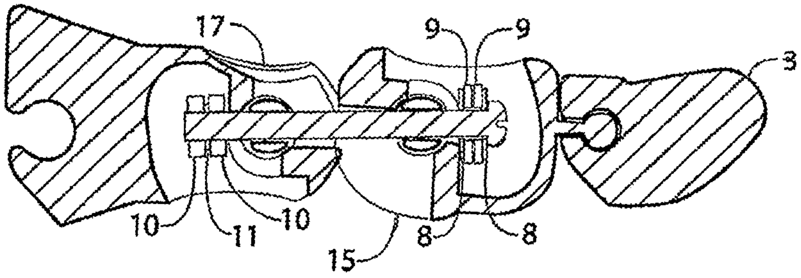
FIG. 10C is a section of the dorsal PIPJ dislocation of FIG. 3C demonstrating the resting position of FIG. 1C.

FIGS. 10A, 10B, and 10C are section views demonstrating the reduction of a dorsal dislocation via exaggerated hyperextension using the concave surface 17 and convex surface 15. These figures show positions of the finger during a dorsal reduction. To perform the dorsal reduction, the model is initially set in the dislocated position. See FIG. 10A. To provide the correct movement toward hyperextension (FIG. 10B), pressure is applied perpendicular to the plane of the middle portion 2 until the convexity 17 on the dorsal surface of the proximal portion 1 fits with the articulating concavity 15 that is on the proximal volar side of the middle portion 2. To reduce the model finger from the hyperextended position (FIG. 10B) pressure is applied perpendicular to the plane of the middle portion 2 with concomitant hyperextension until the joint is in the reduced position. (See FIG. 10C). To create resistance, the resilient washers 9 compress when force is applied to the middle portion 2, as the proximal side of the middle portion 2 is forced away from the convex surface 17.

Figure 11A:
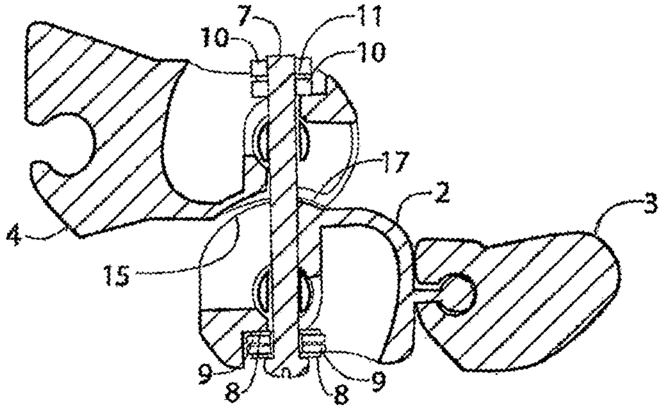
FIG. 11A is a section of the volar PIPJ dislocation of FIG. 8E demonstrating the reduction of a dorsal dislocation of FIG. 1D.
Figure 11B:
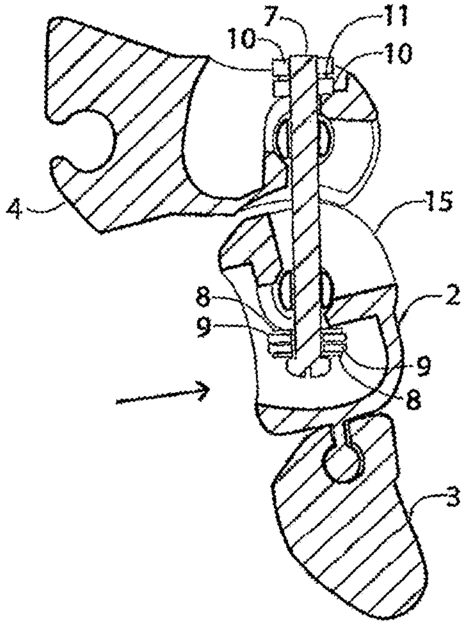
FIG. 11B is a section of the volar PIPJ dislocation of the fifth finger of FIG. 4B demonstrating the exaggeration-by-deformity technique of FIG. 1E.
Figure 11C:
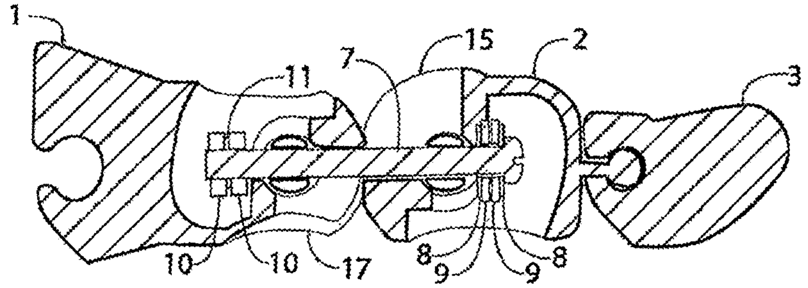
FIG. 11C is a section of the volar PIPJ dislocation of the fifth finger of FIG. 4C demonstrating the resting position of FIG. 1F.

FIGS. 11A, 11B, and 11C are section views demonstrating the reduction of a volar dislocation via exaggerated hyperextension using the concave surface 17 and convex surface 15. These figures show positions of the finger during a volar reduction. To perform the volar reduction, the model is initially set in the dislocated position. See FIG. 11A. To provide the correct movement toward hyperextension (FIG. 11B), pressure is applied perpendicular to the plane of the middle portion 2 until the convexity 17 on the volar surface of the proximal portion 1 fits with the convexity 15 that is on the proximal dorsal surface of the middle portion 2. To reduce the model finger from the hyperextended position (FIG. 11B), pressure is applied to the middle portion 2 with the concomitant hyperextension until the joint is in the reduced position. (See FIG. 11C). To create resistance, the resilient washers 9 compress when force is applied to the middle portion 2, due to the proximal side of middle portion 2 being forced over the convex edge 17.

It will now be understood that our phalangeal dislocation reduction model permits a user to practice reduction of a simple dorsal dislocation of a proximal interphalangeal and the reduction of a simple volar dislocation of a proximal interphalangeal. In use, the dorsal dislocation model may be set in the dislocated position, and if the correct anatomical motions are performed, a person can move the model into the reduced position. The model may be embodied so that the second and third fingers 100, 103 function as a dislocated PIPJ in closed complex dorsal dislocation, and the fourth and fifth fingers 106, 109 function as a closed volar dislocation with reduction achieved by the exaggeration-by-deformity technique. Each of the second, third, fourth, and fifth fingers 100, 103, 106, 109 is detachable from the palm 13 by a corresponding hinge 6. Each hinge 6 movably attaches the proximal portion 1 of one of the fingers 100, 103, 106, 109 to the palm 13. Each hinge 6 may be separated[1] in order to remove a finger 100, 103, 106, 109 from the palm 13. If the hinges 6 are similar to one another, fingers 100, 103, 106, 109 may be movably attached to different locations on the palm 13.

[1]How are the hinges separated? Are the hinges identified in the drawings? If not identified in the drawings, please identify them.

By providing hinges 6 that separate, the fingers 100, 103, 106, 109 may be replaced easily. Furthermore, our model does not require elastic tension bands, which undergo wear and loss of elasticity. In at least one test, recurrent use of our model showed no obvious degradation, even at high-stress locations, such as the pin and hinge. The unique articulation surfaces prevent cheating, allows practitioners to experience the significant tension and pressure needed to successfully reduce the joint, and allows for an easy reset to the dislocated position for the next person.

Many of the components can be 3D printed and the compression pin may be created from components that are readily available at a hardware store. Neoprene washers were found to be a suitable material for the resilient washers 9 given that neoprene can compress and return to the original non-compressed state and size under the forces being sought for moving the joints between the dislocated and non-dislocated positions. Further our model does not require milling, nor is there a need to make resin molds.

To mimic the contribution of the saddle-shaped median 25 for a dorsal or volar dislocation, our model provides without structures akin to ligaments a distal joint concavity 17 (FIG. 9C) along the dorsal surface of the proximal portions 1 with an articulating convexity 15 (FIG. 9C) along the proximal side of the middle portion 2. Once in the dislocated position, two axles 5, which may be formed by 3D printing and are located along the joint axis 26 (FIG. 9A, 9B), prevent movement of the middle portion 2 without the exaggeration-by-deformity technique. To return the model to the dislocated position, one only needs to leave the middle portion 2 in the flexed position and translate the middle portion 2 along the articulating convex surface 15 and concave surface 17.

The model is the first to have removable and easy to replace components and does not require elastic tension bands, which undergo wear and loss of elasticity. Recurrent use by the authors showed no obvious breakdown even at weak points such as the pin and hinge. The unique articulation surfaces prevent 'cheating', allows practitioners to experience the significant tension and pressure needed to successfully reduce the joint, and allows for an easy reset to the dislocated position for the next participant.

PIPJ reduction models are scarce and, at this time there is only one commercially produced, high cost, high fidelity model, which is produced by LUNA® and called the Luna's Joint Reduction Task Trainers (Wright 2020). There are online instructional tutorials using homemade models, but the designs themselves are not available (Polanksy R and Kwon N). Further, this is the first model made with the ability to replace components with 3D printed components and the fastening component pieces are readily available and purchasable at a hardware store. Further the unique design does not require milling, nor is there a need to make resin molds.

Now that features of the invention and some embodiments of the invention have been described, an outline (non-limiting) of various embodiments of the invention is stated as follows:

Statement 1. A model hand comprising:
- a portion resembling a palm;
- at least one finger having:
  - a proximal portion hingedly connected to the palm;
  - a middle portion; and
  - a distal portion connected to the middle portion;
- a compression pin having:
  - a screw having two ends;
  - a resilient washer positioned at a first of the two ends; and
  - a nut positioned at a second of the two ends.
- wherein the compression pin extends from a dorsal side of the middle portion to a volar side of the proximal portion.

Statement 2. The model of Statement 1, wherein the distal portion is hingedly connected to the middle portion.

Statement 3. The model of Statement 1, wherein the proximal portion has a longitudinal orifice, and the model further comprises an axle residing in the longitudinal orifice, the axle having a through-hole oriented perpendicular to the longitudinal orifice, and the screw extends through the through hole.

Statement 4. The model of Statement 1, wherein the middle portion has a longitudinal orifice, and the model further comprises an axle residing in the longitudinal orifice, the axle having a through-hole oriented perpendicular to the longitudinal orifice, and the screw extends through the through hole.

Statement 5. The model of Statement 1, wherein:
- the proximal portion has a longitudinal orifice (the "PPLO"), and the model further comprises a first axle residing in the PPLO, the first axle having a through-hole oriented perpendicular to the PPLO, and the screw extends through the first axle's through hole.
- the middle portion has a longitudinal orifice (the "MPLO"), and the model further comprises a second axle residing in the MPLO, the second axle having a through-hole oriented perpendicular to the MPLO, and the screw extends through the second axle's through hole.

Statement 6. The model of Statement 1, wherein the proximal portion has a concave surface on a dorsal side of the proximal portion that is distal from the palm.

Statement 7. The model of Statement 6, wherein the middle portion has a convex surface on volar side of the middle portion that is proximal to the palm.

Statement 8. The model of Statement 1, wherein the resilient washer is partially surrounded by the middle portion.

Statement 9. The model of Statement 1, wherein the resilient washer is partially surrounded by the proximal portion.

Statement 10. The model of Statement 1, wherein the nut is partially surrounded by the proximal portion.

Statement 11. The model of Statement 1, wherein the nut is partially surrounded by the middle portion.

Statement 12. The model of Statement 1, wherein the proximal portion has a concave surface on a volar side of the proximal portion that is distal from the palm.

Statement 13. The model of Statement 12, wherein the middle portion has a convex surface on dorsal side of the middle portion that is proximal to the palm.

Statement 14. A model hand comprising:
- a portion resembling a palm;
- at least one finger having:
  - a proximal portion hingedly connected to the palm, the proximal portion having a concave surface on a dorsal side of the proximal portion that is distal from the palm;
  - a middle portion, the middle portion having a convex surface on volar side of the middle portion that is proximal to the palm; and
  - a distal portion connected to the middle portion;
- a compression pin having:
  - a screw having two ends;
  - a resilient washer positioned at a first of the two ends; and
  - a nut positioned at a second of the two ends.
- wherein the compression pin extends from a dorsal side of the middle portion to a volar side of the proximal portion.

Statement 15. The model of Statement 14, wherein the distal portion is hingedly connected to the middle portion.

Statement 16. The model of Statement 14, wherein the proximal portion has a longitudinal orifice, and the model further comprises an axle residing in the longitudinal orifice, the axle having a through-hole oriented perpendicular to the longitudinal orifice, and the screw extends through the through hole.

Statement 17. The model of Statement 14, wherein the middle portion has a longitudinal orifice, and the model further comprises an axle residing in the longitudinal orifice, the axle having a through-hole oriented perpendicular to the longitudinal orifice, and the screw extends through the through hole.

Statement 18. The model of Statement 14, wherein:

- the proximal portion has a longitudinal orifice (the "PPLO"), and the model further comprises a first axle residing in the PPLO, the first axle having a through-hole oriented perpendicular to the PPLO, and the screw extends through the first axle's through hole.
- the middle portion has a longitudinal orifice (the "MPLO"), and the model further comprises a second axle residing in the MPLO, the second axle having a through-hole oriented perpendicular to the MPLO, and the screw extends through the second axle's through hole.

Statement 19. The model of Statement 14, wherein the resilient washer is partially surrounded by the middle portion.

Statement 20. The model of Statement 14, wherein the resilient washer is partially surrounded by the proximal portion.

Statement 21. The model of Statement 14, wherein the nut is partially surrounded by the proximal portion.

Statement 22. The model of Statement 14, wherein the nut is partially surrounded by the middle portion.

Statement 23. The model of Statement 14, further comprising another finger having:

- a proximal portion hingedly connected to the palm, the proximal portion having a concave surface on a volar side of the proximal portion that is distal from the palm;
- a middle portion, the middle portion having a convex surface on dorsal side of the middle portion that is proximal to the palm; and
- a distal portion connected to the middle portion.

Statement 24. A model hand comprising:

- a portion resembling a palm;
- at least one finger having:
  - a proximal portion hingedly connected to the palm, the proximal portion having a concave surface on a volar side of the proximal portion that is distal from the palm;
  - a middle portion, the middle portion having a convex surface on dorsal side of the middle portion that is proximal to the palm; and
  - a distal portion connected to the middle portion;
- a compression pin having:
  - a screw having two ends;
  - a resilient washer positioned at a first of the two ends; and
  - a nut positioned at a second of the two ends.
- wherein the compression pin extends from a volar side of the middle portion to a dorsal side of the proximal portion.

Statement 25. The model of Statement 24, wherein the distal portion is hingedly connected to the middle portion.

Statement 26. The model of Statement 24, wherein the proximal portion has a longitudinal orifice, and the model further comprises an axle residing in the longitudinal orifice, the axle having a through-hole oriented perpendicular to the longitudinal orifice, and the screw extends through the through hole.

Statement 27. The model of Statement 24, wherein the middle portion has a longitudinal orifice, and the model further comprises an axle residing in the longitudinal orifice, the axle having a through-hole oriented perpendicular to the longitudinal orifice, and the screw extends through the through hole.

Statement 28. The model of Statement 24, wherein, the proximal portion has a longitudinal orifice (the "PPLO"), and the model further comprises a first axle residing in the PPLO, the first axle having a through-hole oriented perpendicular to the PPLO, and the screw extends through the first axle's through hole.

- the middle portion has a longitudinal orifice (the "MPLO"), and the model further comprises a second axle residing in the MPLO, the second axle having a through-hole oriented perpendicular to the MPLO, and the screw extends through the second axle's through hole.

Statement 29. The model of Statement 24, wherein the resilient washer is partially surrounded by the middle portion.

Statement 30. The model of Statement 24, wherein the resilient washer is partially surrounded by the proximal portion.

Statement 31. The model of Statement 24, wherein the nut is partially surrounded by the proximal portion.

Statement 32. The model of Statement 24, wherein the nut is partially surrounded by the middle portion.

Statement 33. The model of Statement 24, further comprising another finger having:

- a proximal portion hingedly connected to the palm, the proximal portion having a concave surface on a dorsal side of the proximal portion that is distal from the palm;
- a middle portion, the middle portion having a convex surface on volar side of the middle portion that is proximal to the palm; and
- a distal portion connected to the middle portion.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A model hand comprising:

- a palm;
- at least one finger having:
  - a proximal portion hingedly connected to the palm;
  - a middle portion; and
  - a distal portion connected to the middle portion;
- a compression pin having:
  - a screw having two ends;
  - a resilient washer positioned at a first of the two ends; and
  - a nut positioned at a second of the two ends;
- wherein the compression pin extends from a dorsal side of the middle portion to a volar side of the proximal portion.

2. The model of claim 1, wherein the distal portion is hingedly connected to the middle portion.

3. The model of claim 1, wherein the proximal portion has a longitudinal orifice, and the model further comprises an axle residing in the longitudinal orifice, the axle having a through-hole oriented perpendicular to the longitudinal orifice, and the screw extends through the through hole.

4. The model of claim 1, wherein the middle portion has a longitudinal orifice, and the model further comprises an axle residing in the longitudinal orifice, the axle having a through-hole oriented perpendicular to the longitudinal orifice, and the screw extends through the through hole.

5. The model of claim 1, wherein:

the proximal portion has a longitudinal orifice (the "PPLO"), and the model further comprises a first axle residing in the PPLO, the first axle having a through-hole oriented perpendicular to the PPLO, and the screw extends through the first axle's through hole;

the middle portion has a longitudinal orifice (the "MPLO"), and the model further comprises a second axle residing in the MPLO, the second axle having a through-hole oriented perpendicular to the MPLO, and the screw extends through the second axle's through hole.

6. The model of claim 1, wherein the proximal portion has a concave surface on a dorsal side of the proximal portion that is distal from the palm.

7. The model of claim 6, wherein the middle portion has a convex surface on volar side of the middle portion that is proximal to the palm.

8. The model of claim 1, wherein the resilient washer is partially surrounded by the middle portion.

9. The model of claim 1, wherein the resilient washer is partially surrounded by the proximal portion.

10. The model of claim 1, wherein the nut is partially surrounded by the proximal portion.

11. The model of claim 1, wherein the nut is partially surrounded by the middle portion.

12. The model of claim 1, wherein the proximal portion has a concave surface on a volar side of the proximal portion that is distal from the palm.

13. The model of claim 12, wherein the middle portion has a convex surface on dorsal side of the middle portion that is proximal to the paint.

14. A model hand comprising:

a palm;

at least one finger having:

a proximal portion hingedly connected to the palm, the proximal portion having a concave surface on a dorsal side of the proximal portion that is distal from the palm;

a middle portion, the middle portion having a convex surface on volar side of the middle portion that is proximal to the palm; and a distal portion connected to the middle portion;

a compression pin having:

a screw having two ends;

a resilient washer positioned at a first of the two ends; and a nut positioned at a second of the two ends;

wherein the compression pin extends from a dorsal side of the middle portion to a volar side of the proximal portion.

15. The model of claim 14, wherein the distal portion is hingedly connected to the middle portion.

16. The model of claim 14, wherein the proximal portion has a longitudinal orifice, and the model further comprises an axle residing in the longitudinal orifice, the axle having a through-hole oriented perpendicular to the longitudinal orifice and the screw extends through the through hole.

17. The model of claim 14, wherein the middle portion has a longitudinal orifice, and the model further comprises an axle residing in the longitudinal orifice, the axle having a through-hole oriented perpendicular to the longitudinal orifice, and the screw extends through the through hole.

18. The model of claim 14, wherein:

the proximal portion has a longitudinal orifice (the "PPLO"), and the model further comprises a first axle residing in the PPLO, the first axle having a through-hole oriented perpendicular to the PPLO, and the screw extends through the first axle's through hole;

the middle portion has a longitudinal orifice (the "MPLO"), and the model further comprises a second axle residing in the MPLO, the second axle having a through-hole oriented perpendicular to the MPLO, and the screw extends through the second axle's through hole.

19. The model of claim 14, wherein the resilient washer is partially surrounded by the middle portion.

20. The model of claim 14, wherein the resilient washer is partially surrounded by the proximal portion.

21. The model of claim 14, wherein the nut is partially surrounded by the proximal portion.

22. The model of claim 14, wherein the nut is partially surrounded by the middle portion.

23. The model of claim 14, further comprising another finger having:

a proximal portion hingedly connected to the palm, the proximal portion having a concave surface on a volar side of the proximal portion that is distal from the palm;

a middle portion, the middle portion having a convex surface on dorsal side of the middle portion that is proximal to the palm; and a distal portion connected to the middle portion.

24. A model hand comprising:

a palm;

at least one finger having:

a proximal portion hingedly connected to the palm, the proximal portion having a concave surface on a volar side of the proximal portion that is distal from the palm;

a middle portion, the middle portion having a convex surface on dorsal side of the middle portion that is proximal to the palm; and a distal portion connected to the middle portion;

a compression pin having:

a screw having two ends;

a resilient washer positioned at a first of the two ends; and a nut positioned at a second of the two ends;

wherein the compression pin extends from a volar side of the middle portion to a dorsal side of the proximal portion.

25. The model of claim 24, wherein the distal portion is hingedly connected to the middle portion.

26. The model of claim 24, wherein the proximal portion has a longitudinal orifice, and the model further comprises an axle residing in the longitudinal orifice, the axle having a through-hole oriented perpendicular to the longitudinal orifice, and the screw extends through the through hole.

27. The model of claim 24, wherein the middle portion has a longitudinal orifice, and the model further comprises an axle residing in the longitudinal orifice, the axle having a through-hole oriented perpendicular to the longitudinal orifice, and the screw extends through the through hole.

28. The model of claim 24, wherein, the proximal portion has a longitudinal orifice (the "PPLO"), and the model further comprises a first axle residing in the PPLO, the first axle having a throughhole oriented perpendicular to the PPLO, and the screw extends through the first axle's through hole;

the middle portion has a longitudinal orifice (the "MPLO"), and the model further comprises a second axle residing in the MPLO, the second axle having a through-hole oriented perpendicular to the MPLO, and the screw extends through the second axle's through hole.

29. The model of claim 24, wherein the resilient washer is partially surrounded by the middle portion.

30. The model of claim 24, wherein the resilient washer is partially surrounded by the proximal portion.

31. The model of claim 24, wherein the nut is partially surrounded by the proximal portion.

32. The model of claim 24, wherein the nut is partially surrounded by the middle portion.

33. The model of claim 24, further comprising another finger having:

a proximal portion hingedly connected to the palm, the proximal portion having a concave surface on a dorsal side of the proximal portion that is distal from the palm;

a middle portion, the middle portion having a convex surface on volar side of the middle portion that is proximal to the palm; and a distal portion connected to the middle portion.

* * * * *